United States Patent [19]

Anderson et al.

[11] 3,897,452
[45] July 29, 1975

[54] SUBSTITUTED 1,4-DIHYDRO(AND 1,2,3,4-TETRAHYDRO)-NAPHTHALEN-1,4-IMINES

[75] Inventors: Paul S. Anderson, Lansdale; Marcia E. Christy, Perkasie; Gerald S. Ponticello, Lansdale, all of Pa.

[73] Assignee: Merck & Co., Inc., Rahway, N.J.

[22] Filed: Aug. 19, 1974

[21] Appl. No.: 498,485

[52] U.S. Cl............................... 260/326.1; 424/274
[51] Int. Cl............................................. C07d 27/48
[58] Field of Search ................................. 260/326.1

[56] References Cited
UNITED STATES PATENTS
3,705,151   12/1972   Weber et al. .................... 260/326.1

Primary Examiner—Donald G. Daus
Assistant Examiner—Anne Marie T. Tighe
Attorney, Agent, or Firm—James A. Arno; Harry E. Westlake, Jr.; Rudolph J. Anderson, Jr.

[57] ABSTRACT

Substituted 1,4-dihydro(and 1,2,3,4-tetrahydro)naphthalen-1,4-imines are disclosed having minor tranquilizer, anticonvulsant and muscle relaxant pharmaceutical activity; also disclosed are processes for the preparation of such compounds; pharmaceutical compositions comprising such compounds; and methods of treatment comprising administering such compounds and compositions.

6 Claims, No Drawings

SUBSTITUTED 1,4-DIHYDRO(AND 1,2,3,4-TETRAHYDRO)-NAPHTHALEN-1,4-IMINES

BACKGROUND OF THE INVENTION

This invention relates to certain substituted 1,4-dihydro (and 1,2,3,4-tetrahydro)-naphthalen-1,4-imines and their pharmaceutically acceptable salt, ester, and amide derivatives which are useful as minor tranquilizers, anticonvulsants and muscle relaxants. For convenience the compounds of this invention will hereinafter be referred to as "napthalenimines".

This invention also relates to processes for the preparation of such napthalenimines, to pharmaceutical compositions comprising such compounds, and to methods of treatment comprising administering such compounds and compositions.

The compounds of the present invention may generically be represented by the following structural formula:

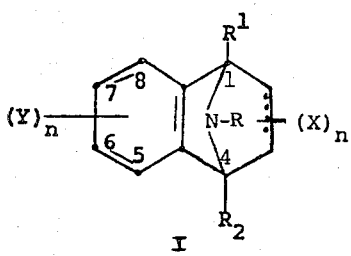

wherein the dotted line indicates provision for 2,3-unsaturation;

R is hydrogen, alkyl, aralkyl, or cycloalkyl;

$R^1$ and $R^2$ are independently selected from the group consisting of hydrogen, alkyl, haloalkyl, haloalkylsulfonyl, or haloalkylthio; alkenyl, and dialkylaminoalkyl;

X and Y are independently selected from the group consisting of halogen such as chloro, fluoro, bromo and the like, alkoxy, alkyl, cyano, carboxy, carboxyamido, haloalkyl, haloalkylthio, allyl, aralkyl, cycloalkyl, aroyl, aralkoxy, nitro, alkanoyl, aryl, substituted aryl, alkylthio, alkylsulfonyl, haloalkylsulfonyl, alkylsulfinyl, haloalkylsulfinyl, arylthio, haloalkoxy, amino, aminoalkyl, alkylamino, dialkylamino, hydroxy, carbamoyl, N-alkylcarbamoy, N,N-dialkylcarbamoyl, dialkylsulfamoyl, and oxo:

n is an integer selected from 0 (X or Y is hydrogen, respectively), 1, 2, 3, or 4.

Thus, it is an object of the present invention to provide naphthalenimines of the above general description (I). It is also an object of this invention to provide pharmaceutical compositions comprising such naphthalenimines and their non-toxic, pharmaceutically acceptable salt, ester and amide derivatives. Lastly, it is an object of the present invention to provide methods of treatment comprising administering the compounds and compositions of the present invention in situations where a minor tranquilizer and/or muscle relaxant and/or anticonvulsant effect is indicated.

DETAILED DESCRIPTION OF THE INVENTION

With respect to the naphthalenimines of the present invention (Structure I, above-depicted), the preferred embodiments are those wherein:
$R^1$ and $R^2$ are independently selected from the group consisting of hydrogen, lower alkyl, and halo lower alkyl having from 1 to about 6 carbon atoms, or dialkylaminoalkyl having from 3 to about 15 carbon atoms;

R is hydrogen or lower alkyl having from about 1 to about 6 carbon atoms, or cycloalkyl having from 3 to about 6 carbon atoms;

Y and X are independently selected from the group consisting of lower alkyl having from 1 to about 6 carbon atoms, fluoro, chloro, bromo, lower alkoxy having from 1 to about 6 carbon atoms, halo-substituted lower alkoxy having from 1 to about 6 carbon atoms, halo lower alkyl having from 1 to about 6 carbon atoms, cyano, carboxy, carboxamido, oxo, hydroxy, haloalkylsulfonyl such as trifluoromethyl-sulfonyl, and aminoalkyl;

n is an integer selected from 0 (X or Y is hydrogen, respectively), 1, 2, 3, or 4.

The most preferred naphthalenimines embodiments of the present invention are those (relative to structure I, above) wherein:

$R^1$ and $R^2$ are selected from the group consisting of hydrogen, lower alkyl having from 1 to about 6 carbon atoms, trifluoromethylsulfonyl, trifluoromethyl, diloweralkylamino lower alkyl, such as γ-dimethylaminopropyl and the like;

X is oxo, hydrogen, methylamino, hydroxy, and chloro;

R is hydrogen or lower alkyl having from 1 to about 6 carbon atoms, cyclopropyl, or cyclobutyl;

Y is hydrogen, fluoro, chloro, alkoxy having from 1 to 6 carbon atoms, trifluoromethoxy, trifluoromethyl sulfonyl, trifluoromethylthio, trifluoromethyl, and lower alkyl having from 1 to 6 carbon atoms;

an integer selected from 0 (X or Y is hydrogen, respectively), 1, 2, 3, or 4.

In general, the napthalenimines of the present invention are prepared by reacting an appropriately substituted benzyne (III) with an appropriately substituted pyrrole (IV) according to the following reaction:

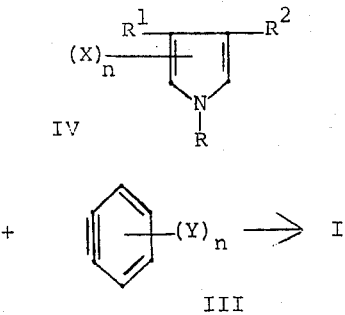

wherein all substitutents are as previously defined and in addition R may be trimethylsilyl.

Preparation of the benzyne and process conditions for the ultimate preparation of the naphthalenimines of the present invention are described hereinafter.

BENZYNE PREPARATION

The transient benzyne reactant may be prepared by a variety of means including flash photolysis of a nuclear substituted benzene or by treatment of an orthodihalobenzene or a monohalo-substituted benzene with a strong base:

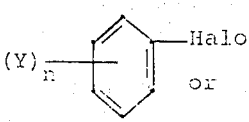

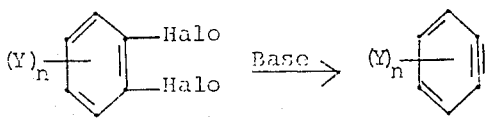

For purposes of the present invention it is preferred that the above illustrated benzyne be generated in situ for immediate Diels-Alder condensation with the substituted pyrrole.

Suitable bases for the above reaction may be selected from the group consisting of alkali and alkaline earth metals and their corresponding oxides, hydrous oxides, alkoxides, alkali metal alkyls, alkali metal amides, and the like. The most preferred bases are magnesium metal, and alkali metal alkyls such as methyllithium, butyllithium, phenyllithium, potassium-tertiary-butoxide, and alkali metal amides such as lithium diisopropylamide, lithium tetramethylpiperidide, sodium amide and the like. There is no undue criticality as to the identity of the reaction solvent and suitable solvents may be selected from hydrocarbons such as benzene, hexane, cyclohexane and the like, oxygenated solvents such as ether, dioxane, tetrahydrofuran, anisole and the like. Typically the reaction is conducted at from about −70°C. to the reflux temperature.

A second method for the preparation of the naphthalenimines of the present invention involves derivatization operations upon the basic naphthalenimine nucleus to provide certain embodiments of the present invention. The following reaction is illustrative of this approach:

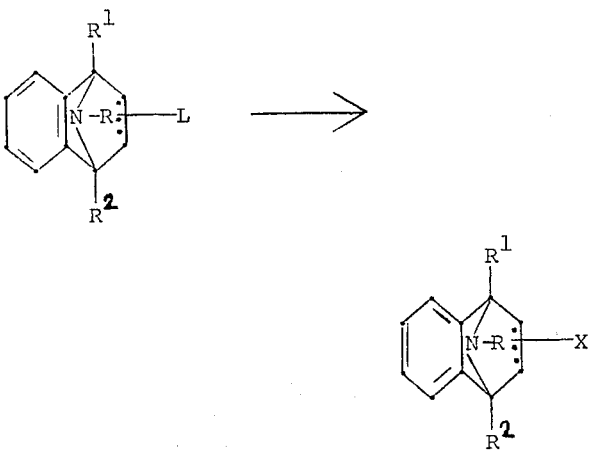

wherein for purposes of illustration the parent compound is shown to be substituted only with the functional group L; however, it is not critical or even preferred that L be the sole nuclear substituent for this aspect of the invention. L may be any chemically modifiable group such as oxo, hydroxy, bromo, iodo, chloro and the like, which may be transformed to function X by well known procedures. X is as previously defined and, especially for this aspect of the invention, embraces radicals such as cyano, trifluoromethylthio, methylthio, and the like. Suitable solvents for this process aspect of the invention include dimethylformamide, hexamethylphosphoramide (HMPT), THF, quinoline and the like. Typically the reaction is conducted at from about 25°C. to the reflux temperature.

Other derivatization reactions which do not involve critical reaction parameters and which are representatively depicted by the examples which follow include: reduction (or hydroboration) of the 1,4-dihydro species to form the 1,2,3,4-tetrahydro species; N-alkylation; and operations upon the 2-oxo species such as reduction, reductive alkylation; and Grignard reactions.

Also included within the scope of the present invention are non-toxic pharmaceutically acceptable salt, ester and amide derivatives of I. Acid addition salts are preferred. Such acid addition salts of the naphthalenime compounds are formed by mixing a solution of the naphthalenimine compound with a solution of a pharmaceutically acceptable non-toxic acid such as hydrochloric acid, fumaric acid, maleic acid, succinic acid, acetic acid, citric acid, tartaric acid, carbonic acid, phosphoric acid, oxalic acid and the like.

In the method of treatment aspect of the present invention, the instant minor tranquilizer naphthalenimines are capable of producing anxiety relief without causing excessive sedation or sleep at a unit dosage level of from about 0.1 to about 500 mg. per kilogram of body weight, or a daily dosage level of from about 0.4 to about 2,000 mg. per kilogram of body weight. In addition, the naphthalenimines of the present invention are useful as muscle relaxants and anticonvulsants when indicated at comparable dosage levels. Of course, it is understood that the exact treatment level will depend upon the case history of the animal or human individual being treated and in the last analysis the precise treatment level falling within the above guidelines is at the routine discretion of the therapist.

Also included within the scope of the present invention are pharmaceutical compositions comprising such naphthalenimines. Preferably these compositions are in unit dosage forms such as tablets, pills, capsules, powders, granules, sterile parenteral solutions or suspensions, and the like. For preparing solid compositions such as tablets, the principal active ingredient is mixed with a pharmaceutical carrier, i.e., conventional tableting ingredients such as corn starch, lactose, sucrose, sorbitorl, talc, stearic acid, magnesium stearate, dicalcium phosphate, gums, and other pharmaceutical diluents, e.g., water, to form a solid preformulation composition containing a homogeneous mixture of a naphthalenimine of the present invention, or a non-toxic pharmaceutically acceptable salt, ester or amide derivative thereof. When referring to these preformulation compositions as homogeneous, it is meant that the active ingredient, i.e., the naphthalenimine, is dispersed evenly throughout the composition so that the composition may be readily subdivided into equallly effective unit dosage forms such as tablets, pills, capsules, and the like. This solid preformulation composition is then subdivided into unit dosage forms of the type described above containing from 0.1 to about 500 mg of the active ingredient of the present invention. The tablets or pills of the novel composition can be coated or otherwise compounded to provide a dosage form affording the advantage of prolonged action of the instant naphthalenimines. For example, the tablet or pill can comprise an inner dosage and an outer dosage component, the latter being in the form of an envelope over the former. The two components can be separated by an enteric layer which serves to resist disintegration in the stomach and permits the inner component to pass intact into the duodenum or to be delayed in release. A variety of materials can be used for such enteric layers or coatings, such materials including a number of polymeric acids or mixtures of polymeric acids with such materials as shellac, shellac and cetyl alcohol, cellulose acetate, and the like.

The liquid forms in which the novel composition of the present invention may be incorporated for administration orally or by injection include aqueous solutions, suitably flavored syrups, aqueous or oil suspensions, flavored emulsions with edible oils such as cottonseed oil, sesame oil, coconut oil, peanut oil and the like, as well as elixirs and similar pharmaceutical vehicles. Suitable dispersing or suspending agents for aqueous suspensions include synthetic and natural gums such as tragacanth, acacia, alginate, dextran, sodium carboxymethylcellulose, methylcellulose, polyvinylpyrrolidone, gelatin and the like.

The pharmaceutical naphthalenimine formulations of the present invention can be administered orally, parenterally, or rectally. Orally, they may be administered in tablets, capsules, suspensions or syrups, the preferred dosage form being a compressed tablet containing from 0.1 to about 500 mg. of the active ingredient. The optimum dosage depends of course on the dosage form being used and the type and severity of the condition being treated. In any specific case, as previously mentioned, the appropriate dosage selected will further depend on factors of the patient which may influence response to the drug, for example, general health, age, weight, and the desired effect.

The following Examples representatively illustrate, but do not limit, the product, process, method of treatment, and compositional aspects of the present invention.

EXAMPLE 1

2-Chloro-5,6,7,8-tetrafluoro-2,9-dimethyl-1,2,3,4-naphthalen-1,4-imine

A solution of 5, 6, 7, 8-tetrafluoro-9-methyl-1,2,3,4-tetrahydronaphthalen-1,4-imin-2-one (3.0 g.) in 100 ml. of ether is treated with 1.5 molar $CH_3Li$ in ether (20 ml.) and stirred overnight. The reaction mixture is poured into ice water and extracted with ether (2 × 100 ml.). The combined extracts are dried over $Na_2SO_4$, filtered and the filtrate evaporated to yield crystalline material which is sublimed 100°C./0.2 mm. to yield 2.0 g. of 5, 6, 7, 8-tetrafluoro-2,9-dimethyl-1,2,3,4-naphthalen-1,4-imin-2-ol, m.p. 110°–137°C. This product is dissolved in 100 ml. of benzene and treated under reflux with 1.5 g. of $SoCl_2$. The solvent is evaporated and the residue treated with 2% NaOH solution (50 ml.). The aqueous mixture is extracted with ether (2 × 200 ml.). The combined ether extracts are dried over $MgSO_4$, filtered and the filtrate concentrated under reduced pressure. Distillation of the concentrate gives 1.6 g. of product, b.p. 60°–65°C./0.4 mm. Treatment of the residue with methanolic hydrogen chloride (1.0 M), evaporation of the solvent and recrystallization of the residue from acetone gives the hydrochloride, m.p. 162°–165°C.

Analysis Calc. for $C_{12}H_{10}NF_4Cl.HCl$: Calc.: C, 45.60; H, 3.52; N, 4.43. Found: C, 44.30; H, 3.69; N, 4.33.

EXAMPLE 2

5, 6, 7, 8-Tetrafluoro-9-methyl-1,4-dihydronaphthalen-1,4-imine

A flame dried 500 ml. flask under $N_2$ is cooled to −70°C in a dry ice/acetone bath and charged with 2.08 molar butyllithium in hexane (72 ml. ) and ether (100 ml.). Pentafluorobenzene (25 g.) is added dropwise with stirring at −70°C over 15 minutes. A solution of N-methylpyrrole (27.5 g.) in ether (50 ml.) is added dropwise. Stirring is continued for two hours while the temperature is raised to 25°C. The reaction mixture is extracted with 4 N aqueous $H_2SO_4$ (3 × 150 ml.). The combined acidic extracts are made alkaline with 4 N aqueous NaOH and extracted with ether (2 × 300 ml.). The combined extracts are dried over $Na_2SO_4$, filtered and the filtrate concentrated to dryness. Sublimation of the residue at 0.5 mm. and 80°–90°C. gives 18.5 g. of product, m.p. 76°–78°C.

EXAMPLE 3

2-Aminomethyl-9-methyl-5,6,7,8-tetrafluoro-1,2,3,4-tetrahydronaphthalen-1,4-imin-2-ol A mixture of 5,6,7,8-tetrafluoro-9-methyl-1,2,3,4-tetrahydronaphthalen-1,4-imin-2-one (1.5 g.), KCN (1.5 g.) and $NH_4Cl$ (2.0 g.) in 75 ml. of 50% aqueous methanol is stirred for 24 hours. The methanol is evaporated under reduced pressure, water (50 ml.) is added and the aqueous mixture is extracted with ether (2 × 100 ml.). The ether extracts are combined, dried over $Na_2SO_4$, filtered and the filtrate concentrated to dryness. The residue is washed with hexane and then dissolved in 50 ml. of THF and treated with 1.0 molar borane in THF (30 ml.). The resulting solution is stirred 24 hours at room temperature and then treated with 5 ml. of $H_2O$ added dropwise. The solvent is evaporated under reduced pressure. The residue is treated with 50 ml. of water and 10 ml. of 40% aqueous sodium hydroxide solution and extracted with ether (2 × 200 ml.). The combined extracts are dried over $MgSO_4$, filtered and the filtrate evaporated to dryness. The residue is recrystallized from heptane to yield the product, m.p. 144°–146°C.

Analysis Calc. for $C_{12}H_{12}N_2OF_4$: Calc.: C, 52.17; H, 4.38; N, 10.12. Found: C, 52.11; H, 4.49; N, 9.99.

EXAMPLE 4

5,6,7,8-Tetrafluoro-9-methyl-1,2,3,4-tetrahydronaphthalen-1,4-imin-2-one

A mixture of 5,6,7,8-tetrafluoro-9-methyl-1,2,3,4-tetrahydronaphthalen-1,4-imin-2-ol (2.3g.), DMSO (30 ml.) and $(C_2H_5)_3N$ (30 g.) is rapidly stirred as a solution of $(CH_3)_3N.SO_3$ complex (4.2 g.) in DMSO (40 ml.) is added dropwise over 30 minutes. The resulting mixture is stirred for 24 hours. The reaction mixture is poured in 1 liter of $H_2O$ and extracted with ether (5 × 200 ml.). The combined ether extracts are washed with 10% aqueous sodium chloride solution (2 × 200 ml.), dried over $Na_2SO_4$, filtered and the filtrate evaporated.

Sublimation of the residue at 80°C. and 0.2 mm. gives 1.7 g. of the product ketone, m.p. 101°–103°C.

Analysis Calc. for $C_{11}H_7F_4NO$: Calc.: C, 53.88; H, 2.85; N, 5.71. Found: C, 53.83; H, 3.04; N, 5.58.

EXAMPLE 5

6-Methoxy-9-methyl-1,4-dihydronaphthalen-1,4-imine

To a solution of 6-methoxy-1,4-dihydronaphthalen-1,4-imine (1.0 g.) and 37% aqueous formaldehyde (4ml.) in 45 ml. of acetonitrile is added $NaCNBH_4$ (1.0 g.). The pH of the reaction medium is adjusted to 7.0 with acetic acid and the reaction mixture is stirred overnight. The solvent is evaporated and 50 ml. of 2N KOH is added. The aqueous mixture is extracted with ether (2 × 100 ml.). The extracts are combined, dried over $Na_2SO_4$, filtered and the filtrate concentrated under reduced pressure. Distillation of the concentrate gives 0.8 g. of product, b.p. 88°/0.5mm. The distillate is dissolved in hot isopropanol (minimum volume) and treated with fumaric acid (saturated isopropanol solution, dropwise) to yield on cooling a crystalline fumarate, m.p. 135°–137°C.

Analysis calc. for: $C_{11}H_{11}NO$. 1 1/2 $C_4H_4O_4$: Calc.: C, 58.79; H, 4.98; N, 4.03. Found: C, 59.03; H, 4.32; N, 5.36.

EXAMPLE 6

6-Methoxy-1,4-dihydronaphthalen-1,4-imine

A mixture of 2-iodo-4-methoxybromobenzene (12.6 g.), magnesium (1.0 g.) and N-trimethylsilylpyrrole (7.5 g.) in 100 ml. of THF are stirred and heated under reflux in a $N_2$ atmosphere for 3 hours, cooled and poured into ice water. The aqueous mixture is ether extracted (3 × 100 ml.). The combined extracts are dried over $Na_2SO_4$, filtered and the filtrate concentrated to dryness under reduced pressure. Distillation of the residue gives 1.7 g. of product, b.p. 70°–90°/0.5 mm. Treatment of a saturated isopropanol solution of the distillate with a saturated fumaric acid solution in isopropanol (dropwise) give the fumarate salt, m.p. 170°–172°C.

Analysis Calc. for $C_{12}H_{13}NO.C_4H_4O_4$: Calc.: C, 63.36; H, 5.60; N, 4.61. Found: C, 63.41; H, 6.01; N, 4.48.

EXAMPLE 7

5,6,7,8-Tetrafluoro-9-methyl-1,2,3,4-tetrahydronaphthalen-1,4-imin-2-ol

To a stirred solution of 5,6,7,8-tetrafluoro-9-methyl-1,4-dihydronaphthalen-1,4-imine (2.3 g.) in THF (75 ml.) is added dropwise, with stirring and external ice bath cooling, 25 ml. of 1 molar borane in THF solution. The resulting solution is allowed to stand overnight and then treated with 5 ml. of water added dropwise with stirring followed by 5 ml. of 3M NaOH solution and 3 ml. of 30% $H_2O_2$. The resulting solution is heated at 35°C. for 20 minutes, cooled and treated with 25 g. of $K_2CO_3$. The organic solution was decanted, dried over anhydrous $K_2CO_3$, filtered and the filtrate evaporated to dryness. Sublimation of the residue at 0.1 mm. and 80°–100°C. gives 1.6 g. of product, m.p. 189°C.

Analysis Calc. for: $C_{11}H_9F_4NO$: Calc.: C, 53.44; H, 3.64; N, 5.66. Found: C, 53.09; H, 3.64; N,5.58.

EXAMPLE 8

2,3-dimethyl-6-fluoro-1,4-dihydronaphthalen-1,4-imine

A flame dried flask under $N_2$ is charged with 1.9 molar BuLi (22 ml.) and ether (50 ml.). The flask is cooled to −70°C. in a dry ice acetone bath and a solution of 2,4-difluorobromobenzene (7.2 g.) in ether (20 ml.) is added dropwise with stirring at −70°C. A solution of 3,4-dimethyl-N-trimethylsilylpyrrole (7.2 g.) in ether (10 ml.) is added with stirring and the reaction mixture is allowed to warm slowly to 25°C. Water is added and the aqueous mixture is extracted with ether (2 × 100 ml.). The combined organic extracts are dried over $Na_2SO_4$, filtered and the filtrate evaporated to dryness. The residue is dissolved in hot isopropyl alcohol (minimum volume) and treated with fumaric acid (saturated solution in isopropanol, dropwise) to yield on cooling a fumarate, m.p. 204°–205°C.

Analysis Calc. for: $C_{12}H_{12}FN$. $1.5C_4H_4O_4$: Calc.: C, 59.40; H, 4.99; N, 3.84. Found: C, 58.77, H, 5.12; N, 3.67.

EXAMPLE 9

1,4,9-Trimethyl-6-fluoro-1,4-dihydronaphthalen-1,4-imine

A flame dried flask under $N_2$ is cooled to −70°C. in a dry ice bath and charged with a solution of 2,4-difluorobromobenzene (6.0 g.) in ether (10 ml.) followed by 18 ml. of 1.9 molar BuLi in hexane. A solution of 1,2,5-trimethylpyrrole in ether (20 ml.) is added and the resulting reaction mixture is slowly allowed to come to 25°C with stirring. Water is added and the aqueous layer is extracted with ether (3 × 100 ml.). The combined organic extracts are dried over $Na_2SO_4$, filtered and the filtrate concentrated to dryness. The residue is dissolved in isopropanol (minimum volume) and treated with fumaric acid (saturated solution in isopropanol, dropwise) to yield a crystalline hydrogen fumarate, m.p. m.p. 169°–170°C.

Analysis Calc. for: $C_{13}H_{14}FN.C_4H_4O_4$: Calc.: C, 63.95; H, 5.66; N, 4.39. Found: C, 63.51; H, 5.72; N, 4.29.

EXAMPLE 10

6-Trifluoromethyl-9-methyl-1,4-dihydronaphthalen-1,4-imine

A solution of 6-trifluoromethyl-1,4-dihydronaphthalen-1,4-imine fumarate (1.93 g.) in acetonitrile (40 ml.) is treated with 37% aqueous formaldehyde (2 ml.) and $NaBH_3CN$ (0.50 g.). The reactioon mixture is stirred overnight at room temperature. The solvent is evaporated and the residue treated with 2N KOH (50 ml.). The aqueous mixture is extracted with ether (3 × 100 ml.). The combined extracts are dried over $Na_2SO_4$, filtered and the filtrate concentrated to dryness. The residue is dissolved in isopropanol (minimum volume) and treated with fumaric acid (saturated solution in isopropanol, dropwise) to yield a crystalline fumarate, m.p. 168°–170°C.

Analysis Calc. for: $C_{12}H_{10}F_3N.1.5C_4H_4O_4$: Calc.: C, 54.25; H, 4.04; N, 3.51. Found: C, 53.94; H, 4.03; N, 3.26.

EXAMPLE 11

5,6,7,8-Tetrafluoro-1,4-dihydronaphthalen-1,4-imine

To a mixture of 10 ml. of N-trimethylsilylpyrrole, 35 ml. of THF and 1.2 g. of Mg stirred and heated under reflux under $N_2$ is added dropwise over 1 hour a solution of 12.5 g. of bromopentafluorobenzene in 10 ml. of THF. Heating under reflux is continued for 5 hours. Water (100 ml.) and ether (200 ml.) are added and the organic layer separated, dried over $MgSO_4$, filtered and the filtrate evaporated. Distillation at 0.2 mm. gives the product b.p. 90°–100°C./0.2 mm. which is converted to a fumaric acid salt, m.p. 201°–202°C., on treatment with fumaric acid in isopropyl alcohol according to the procedure of Example 10.

Analysis Calc. for: $C_{10}H_9F_4N.1.5C_4H_4O_4$: Calc.: C, 49.50; H, 2.82; N, 3.60. Found: C, 49.59; H, 2.97; N, 3.54.

EXAMPLE 12

Preparation of Intravenous Solutions

A solution containing 10 mg. of 5,6,7,8-tetrafluoro-9-methyl-1,4-dihydronapthalen-1,4-imine per ml. of injectable solution is prepared in the following manner.

A mixture of 10 mg. of 5,6,7,8-tetrafluoro-9-methyl-1,4-dihydronaphthalene-1,4-imine and 9 mg. of sodium chloride is dissolved in sufficient water for injection to make 1 ml. of solution. The pH is adjusted using hydrochloric acid or aqueous sodium hydroxide to about pH 7.0.

If it is desired that the intravenous solution be used for multi-dose purposes, 1.0 mg. of methyl-p-hydroxybenzoate (methyl paraben) and 0.10 mg. of n-propyl-p-hydroxy benzoate (propyl paraben) are mixed with the other solids before adding water to dissolve the solids. The solution is prepared and stored in such as manner that it is suitably protected from the deleterious effects of the atmosphere. One method by which this can be accomplished is by preparation and storage of the solution in an atmosphere of nitrogen. The resulting solution is sterilized by autoclaving. Injectable solutions comprising 0.1, 1.0, 100.0 mg., respectively, of 5,6,7,8-tetrafluoro-9-methyl-1,4-dihydronaphthalen-1,4-imine ml. of solution are similarly prepared substituting the indicated amount for the above-illustrated 10 mg. quantity. Bulk injectable solutions of convenient volume for subsequent delivery in unit dosage form are readily prepared following the above procedure.

Following the procedure of Example 12, other representative injectable solution of the present invention are prepared when the 5,6,7,8-tetrafluoro-9-methyl-1,4-dihydronaphthalen-1,4-imine of Example 12 is replaced by an equivalent amount of 2-chloro-5,6,7,8-tetrafluoro-2,9-dimethyl-1,2,3,4-naphthalen-1,4-imine hydrochloride or by an equivalent amount of any of the naphthalenimines of the present invention illustrated in the foregoing examples.

EXAMPLE 13

Tablet Preparation

Tablets containing 1.0, 2.0, 25.0, 26.0, 50.0 and 100.0 mg., respectively, of 5,6,7,8-tetrafluoro-9-methyl-1,4-dihydronaphthalen-1,4-imine are prepared as illustrated below.

TABLE FOR DOSES CONTAINING FROM 1–25 MG. OF THE NAPHTHALENIMINES COMPOUND

| | Amount — mg. | | |
|---|---|---|---|
| 5,6,7,8-tetrafluoro-9-methyl-1,4-dihydronaphthalen-1,4-imine | 1.0 | 2.0 | 25.0 |
| Microcrystalline cellulose | 49.25 | 48.75 | 37.25 |
| Modified food corn starch | 49.25 | 48.75 | 37.25 |
| Magnesium stearate | 0.50 | 0.50 | 0.50 |

TABLE FOR DOSES CONTAINING FROM 26–100 MG. OF THE NAPHTHALENIMINE COMPOUND

| | Amount — mg. | | |
|---|---|---|---|
| 5,6,7,8-tetrafluoro-9-methyl-1,4-dihydronaphthalen-1,4-imine | 26.0 | 50.0 | 100.0 |
| Microcrystalline cellulose | 52.0 | 100.0 | 200.0 |
| Modified food corn starch | 2.21 | 4.25 | 8.5 |
| Magnesium stearate | .39 | 0.75 | 1.5 |

All of the 5,6,7,8-tetrafluoro-9-methyl-1,4-dihydronaphthalen-1,4-imine, lactose, and a portion of the corn starch are mixed and granulated to a 10% corn starch paste. The resulting granulation is sieved, dried and blended with the remainder of the corn starch and the magnesium stearate. The resulting granulation is then compressed into tablets containing 1.0 mg., 2.0 mg., 25.0 mg., 26.0 mg., 50.0 mg., and 100.0 mg. of 5,6,7,8-tetrafluoro-9-methyl-1,4-dihydronaphthalen-1,4-imine per tablet.

Following the procedure of Example 13, tablets comprising 2-chloro-5,6,7,8-tetrafluoro-2,9-dimethyl-1,2,3,4-naphthalen-1,4-imine hydrochloride are prepared when the 5,6,7,8-tetrafluoro-9-methyl-1,4-dihydronaphthalen-1,4-imine of Example 13 is replaced by an equivalent amount of 2-chloro-5,6,7,8-tetrafluoro-2,9-dimethyl-1,2,3,4-naphthalen-1,4-imine hydrochloride. Other tablets are prepared using the same procedures and the equivalent amounts of excipients along with equivalent amounts of the naphthalenimine compounds of the present invention prepared in accordance with the procedure of the foregoing Examples.

What is claimed is:

1. 2-Chloro-5,6,7,8-tetrafluoro-2,9-dimethyl-1,2,3,4-naphthalen-1,4-imine and the non-toxic, pharmaceutically acceptable salts thereof.

2. 2-Aminomethyl-9-methyl-5,6,7,8-tetrafluoro-1,2,3,4-tetrahydronaphthalen-1,4-imin-2-ol and the non-toxic, pharmaceutically acceptable salts thereof.

3. 5,6,7,8-Tetrafluoro-9-methyl-1,2,3,4-tetrahydronaphthalen-1,4-imin-2-one and the non-toxic, pharmaceutically acceptable salts thereof.

4. 6-Methoxy-9-methyl-1,4-dihydronaphthalen-1,4-imine and the non-toxic, pharmaceutically acceptable salts thereof.

5. 2,3-Dimethyl-6-fluoro-1,4-dihydronaphthalen-1,4-imine and the non-toxic pharmaceutically acceptable salts thereof.

6. 1,4,9-Trimethyl-6-fluoro-1,4-dihydronaphthalen-1,4-imine and the non-toxic pharmaceutically acceptable salts thereof.

* * * * *

UNITED STATES PATENT OFFICE
CERTIFICATE OF CORRECTION

PATENT NO. : 3,897,452
DATED : July 29, 1975
INVENTOR(S) : Paul S. Anderson et al.

It is certified that error appears in the above-identified patent and that said Letters Patent are hereby corrected as shown below:

In Column 1, lines 42 and 43, "carboxyamido"

should read

--carboxamido---

In Column 2, line 38, "an integer"

should read

--n is an integer"

Signed and Sealed this twenty-first Day of October 1975

[SEAL]

Attest:

RUTH C. MASON
*Attesting Officer*

C. MARSHALL DANN
*Commissioner of Patents and Trademarks*